Dec. 27, 1927.

E. WILDHABER 1,653,686

METHOD OF CUTTING GEAR TEETH

Filed March 2, 1925   3 Sheets-Sheet 1

INVENTOR

Ernest Wildhaber

Dec. 27, 1927. 1,653,686
E. WILDHABER
METHOD OF CUTTING GEAR TEETH
Filed March 2, 1925   3 Sheets-Sheet 2
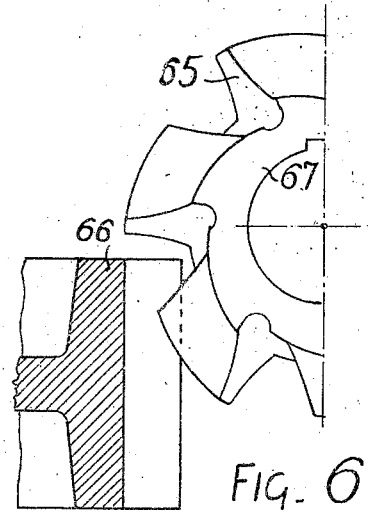
FIG. 6
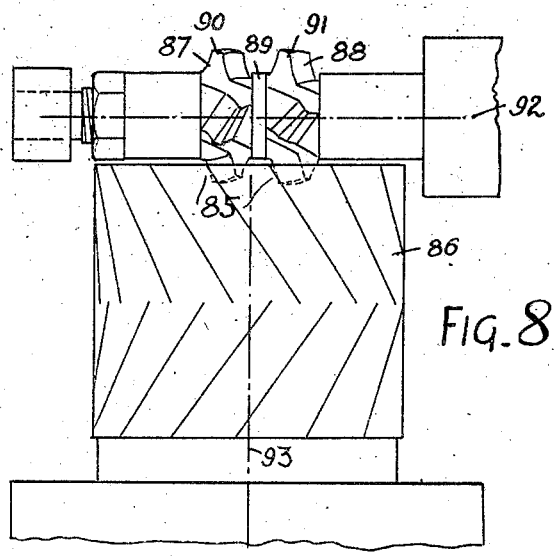
FIG. 8
FIG. 7
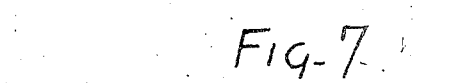
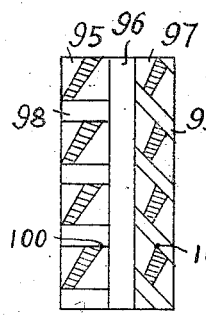
FIG. 9
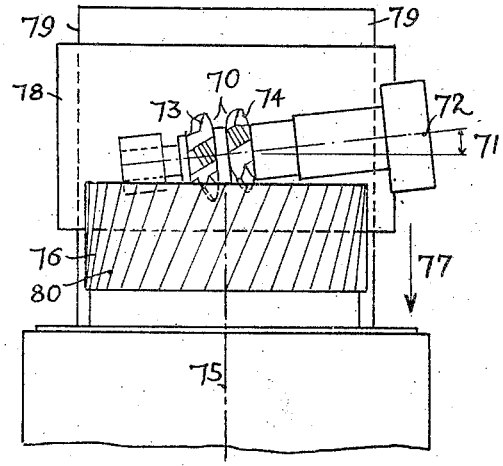
FIG. 17
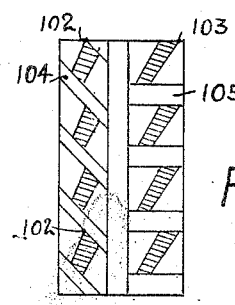
FIG. 10
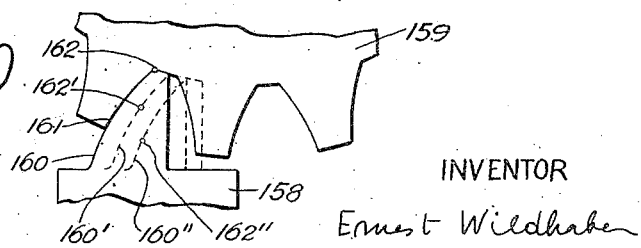
INVENTOR
Ernest Wildhaber Dec. 27, 1927.

E. WILDHABER 1,653,686

METHOD OF CUTTING GEAR TEETH

Filed March 2, 1925 3 Sheets-Sheet 3

INVENTOR:
Ernest Wildhaber

Patented Dec. 27, 1927.

1,653,686

UNITED STATES PATENT OFFICE.

ERNEST WILDHABER, OF ROCHESTER, NEW YORK.

METHOD OF CUTTING GEAR TEETH.

Application filed March 2, 1925. Serial No. 12,572.

My invention relates primarily to cutting straight teeth, helical teeth and double-helical or herringbone teeth on gears, with methods in which a rotating cutting tool acts upon a continuously rotating blank. Such methods are usually known as hobbing methods. My method contains however certain new features, which tend to put it in a class by itself, as will be fully explained hereafter.

As well known, a usual gear hob contains a great number of cutting teeth, and hence is an expensive tool, particularly so, when its pitch is coarse.

One object of my invention is to devise a method of cutting gear teeth in a continuous cycle, that shall permit the use of a moderately priced cutting tool, which contains only a fraction of the number of cutting teeth of a hob.

Another purpose is to provide a method of the above character, which can be carried out with a single cutting tooth.

A main object is to provide a method for accurately cutting gears at an increased rate of production, as will be more fully described hereafter.

A further object is to provide a method for cutting helical and herringbone gears having circular tooth profiles, as disclosed in my application "helical gearing", filed November 2, 1923, Serial No. 672,254.

My method does not require new machines, but can be carried out on hobbing machines of the usual type. It is exemplified in the accompanying drawings, in which Fig. 1 is a plan view of a cutting tool as may be used for performing my method.

Fig. 6 is an end view of a modified cutting tool.

Fig. 7 is a front elevational view of a machine carrying out my method.

Fig. 8 is a front elevational view of a tool and of a blank, prior to cutting engagement.

Fig. 9, Fig. 10 and Fig. 11 are developments of the peripheries of cutting tools.

Figure 17 is a diagrammatic view of a gear blank and a cutting tool illustrative of a modification of the present invention.

Figure 1:
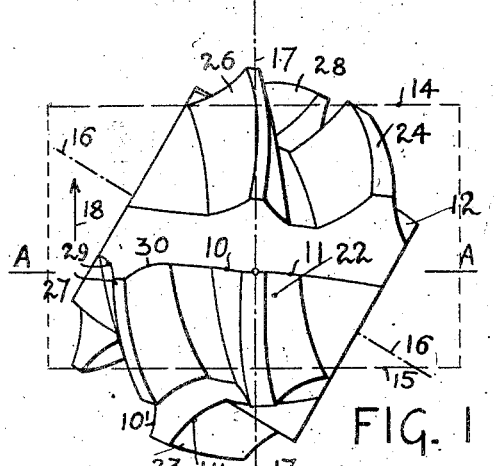
Figure 2:
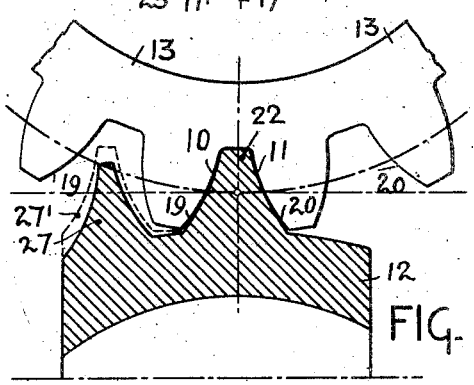
Fig. 2 is a normal section through the thread of the tool shown in Fig. 1, along lines A—A of Fig. 1, the tool being shown in cutting engagement with the teeth of a blank.

Referring to the drawings, and particularly to the Figures 1 and 2, the reference characters 10 and 11 denote two concavely curved cutting edges of a cutting tool 12. A blank 13 is shown in an end view in Fig. 2, and part of its contours are indicated in Fig. 1 at 14 and 15.

To cut teeth in blank 13, cutting tool 12 is rotated on its axis 16, and blank 13 is turned on its axis 17 in timed relation to the rotation of tool 12. In addition, a feeding motion in direction 18 is provided between tool and blank, parallel to the axis 17 of the blank.

A hob of known type forms teeth in a generating operation. The tooth profiles (19 and 20) are then formed by a great number of cutting teeth, of which each cuts a small flat, and thus contributes its share to building up a tooth profile. These cutting teeth have each a different position along the hob axis.

In contradistinction thereto, the cutting edges 10 and 11 are so shaped as to cover the whole length of the tooth profiles 19 and 20, so that no further cutting edges would be necessary to form the profiles 19 and 20.

My method of cutting gears therefore differs from the known hobbing method by not being a generating method, in the specific meaning of the word. In many aspects it might rather be called a copying method, although this should not imply that the cutting edges 10 and 11 are always identical with the tooth profiles 19 and 20.

My process differs from the known process of milling gears tooth after tooth, with disk cutters, by providing a continuous indexing motion of the blank, and therefore by forming the teeth in a continuous cycle.

Instead of a single finish cutting tooth 22, a plurality of identical finish cutting teeth 22, 23, 24 may be provided on the cutting tool, as shown in the drawing. If so desired, these finishing teeth of the cutting tool may be relieved from part of their burdens, by providing in addition teeth 26, 27, 28 ahead of the teeth 22, 23, 24. The cutting edges 29, 30 of such teeth have preferably the same shape as the cutting edges 10 and 11. They are however so positioned as not to come in contact with the finished tooth surfaces, and do only roughing work.

In Fig. 1 and Fig. 2 the cutting edges 10' and 29 and on the other hand 11' and 30 lie in helices of slightly different lead, as evident from the narrower section of tooth 27 (Fig. 2). In this figure the dotted outline 27' indicates the top position of tooth 27.

Figure 3:
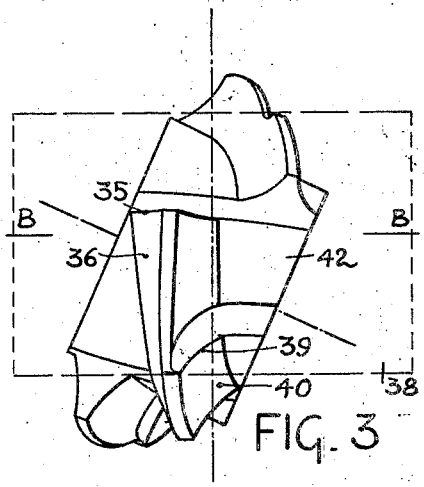
Fig. 3 is a plan view of a cutting tool, indicating a slightly modified way of carrying out my method.
Figure 4:
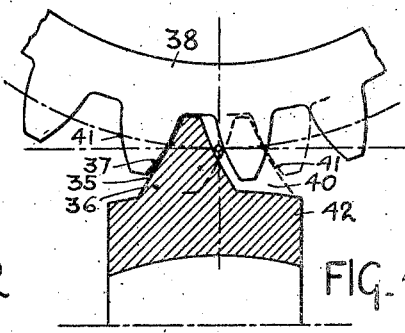
Fig. 4 is a normal section through the tool shown in Fig. 3, in the direction of lines B—B of Fig. 3.

A modification of my invention is indicated in Fig. 3 and Fig. 4.

These two figures, as well as Fig. 1 and Fig. 2 illustrate the process as applied to spur gears with straight teeth, and particularly involute teeth, but it is understood that my invention is applicable to helical and herringbone gears as well, and to any form of tooth profile.

A concavely curved cutting edge 35 of a cutting tooth 36 is so formed, as to be capable of cutting the whole height of the tooth profiles 37 of a blank 38. A similar cutting edge 39 is provided on a cutting tooth 40 to form the profiles 41 of blank 38. It is noted that the finishing edges 35 and 39 are located on different cutting teeth, which may be connected, as indicated in the drawing. The motions of cutting tool 42 and blank 38 are identical with the motions of tool 12 and blank 13 of Fig. 1 and Fig. 2. The finishing cuts, however, are applied alternately to the two sides of the teeth. In Fig. 4 the full lines indicate a cutting tooth 36 acting on tooth side 37, and the dotted lines indicate a cutting tooth 40 acting on tooth side 41 in a subsequent position of the cutting tool.

The shown tools 12 and 42, Figs. 1–4, contain multiple threads, and moreover their finishing edges, such as 11, 11' on tool 12, have the same position along the hob axis. In other words, the number of flutes or gashes, which form the cutting faces, is identical with (Fig. 1), or a multiple (Fig. 3) of the number of threads.

Hobs of the known generating type, if multiple threaded, contain a number of flutes, which has no factor in common with the number of threads, so that every cutting tooth has a different axial position.

The tools 12 and 42 will cover a multiple of complete tooth profiles on the blank, per revolution of the tools, (namely four per tooth side, the shown tools having quadruple threads).

A usual known generating hob is single threaded, and will cover only one complete tooth profile per revolution, referring to one side of the teeth.

Hence it is obvious, that the production can be greatly increased with the disclosed method. When the gear cutting machines are built strong enough, the output of gears can be multiplied. Another feature of the method is that it produces smooth tooth profiles, which consist of continuous lines, and not of a series of flats.

The form of the finishing edges 10 and 11, Fig. 1 and Fig. 2, and of the finishing edges 35 and 39, Fig. 3 and Fig. 4 differ somewhat from the tooth profiles 19, 20 of the blank, or 37, 41 respectively. The difference is negligible on tools containing cutting teeth arranged in the form of a single thread, but increases with increasing number of threads.

Figure 5:
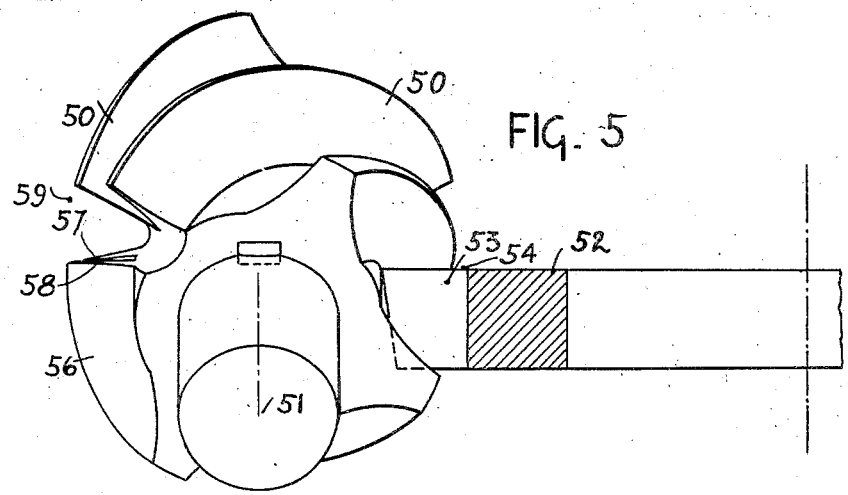
Fig. 5 is an oblique view of an unfinished cutting tool, indicating a way of determining the shape of its cutting edges.

An accurate determination of the shape of a finishing cutting edge is indicated in Fig. 5. 50 denotes an unfinished cutting tool, or an auxiliary body of the same approximate shape. Axis 51 of body 50 is inclined to the angle, to which the cutting tool is set for cutting the teeth of a blank. 52 is a gear identical in shape with the blank to be cut, but for the feature, that its teeth 53 are relieved back of the front 54, and that it is hardened. Gear 52 bears exactly the same relation to body 50 as the blank (13 in Fig. 2) to the cutting tool (12). Body 50 and gear 52 are rotated in timed relation, and body 50 is fed past gear 52, exactly as if a cutting tool 50 would cut a blank 52. Threads 56 are then formed on body 50, which presently furnish the finishing edges 57, 58, when a thread 56 is gashed by a flute 59, identical to the one used on the actual cutting tool.

Cutting edges which shall serve for roughing only, must be inside of thread 56, and not protrude over it.

It is evident that also a single cutting tooth 53 may be employed, instead of a whole gear cutter 52.

In Fig. 6 a disk like cutting tool 65 is shown, which contains only finishing teeth, and resembles a milling cutter with formed cutting edges. The cutting teeth are however inclined to the front 67 of the tool, so that successive teeth may act in successive tooth spaces of a blank.

In Fig. 7 a machine is outlined, which carries out my method on a helical gear. Cutting tool 70 is set at a predetermined angle 71, so that the threads of the tool, or its cutting teeth, fit the teeth to be cut on the blank. Tool 70 is furthermore so adjusted in the direction of its axis 72, that the cutting edges are in the same axial position, for which their shape has been determined, as outlined with reference to Fig. 5. Preferably the finishing edges 73, 74 are equally distant from the projected axis 75 of blank 76.

Cutting tool 70 is then rotated on its axis 72, and blank 76 is turned in timed relation on its axis 75. Tool 70 is fed across the face of the blank, in the direction of arrow 77, parallel to axis 75 of said blank, by moving slide 78 on vertical guidances 79. While the feed progresses, the rotation of the hob, or of the blank, must be slightly changed, in correspondence with the helix of the teeth 80, in the same way as in the known hobbing process.

Fig. 8 shows a tool 85 prior to cutting engagement with a herringbone gear 86.

It is noted that the tools 70 and 85 consist of two parts, which finish opposite sides of the teeth. The two parts, 87 and 88 in Fig. 8, can be relatively adjusted, by changing the spacing ring 89, or in any other suitable way. This possibility of adjustment permits to provide cutting teeth 90, 91, which are not only inwardly relieved, but also sidewise, in the direction of axis 92 of tool 85, without incurring errors in the produced tooth shape or changes in the tooth thickness. The finishing sides of the two parts 87, 88 are relieved toward or away from each other, depending on whether the finishing edges are on the outside or on the inside of tool 85.

This kind of relief tends to preserve the diameter of the tool, after resharpening, and hence insures a more accurate tool. Moreover it provides ample side clearance also in cases, where parts of the cutting edges are nearly radial, and where an inwardly, or radially, relieved tool has practically no clearance.

Figure 12:
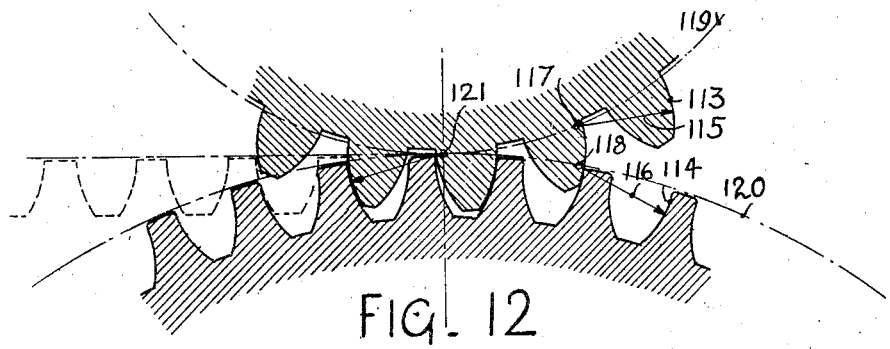
Fig. 12 is a sectional view of a pair of helical or herringbone gears, indicating a form of tooth, to which my method is especially well applicable.

For these reasons such tools are particularly desirable, when the teeth of a pair of gears are of dissimilar tooth shape, for instance as indicated in Fig. 12.

After resharpening, the two parts 87 and 88 of tool 85 are so set, that the finishing edges are at the predetermined distance from the projected axis 93 of the blank, for which distance they have been determined, and the distance between the two parts 87 and 88 is correspondingly changed.

A cutting tool containing two separate groups of cutting teeth, for finishing opposite tooth sides of a blank, has the further advantage that very keen cutting edges may readily be obtained by providing differently inclined cutting faces on the two groups of cutting teeth.

Fig. 9 shows the developed periphery of a cutting tool, which consists of a part 95, spacing ring 96, and part 97. Flutes or cutting faces 98, 99 of such inclination are provided, as to sharpen the cutting angle of the inwardly disposed finishing edges 100 and 101.

Fig. 10 shows a tool with outwardly disposed finishing edges 102, 103, and correspondingly inclined flutes 104, 105.

Figure 11:
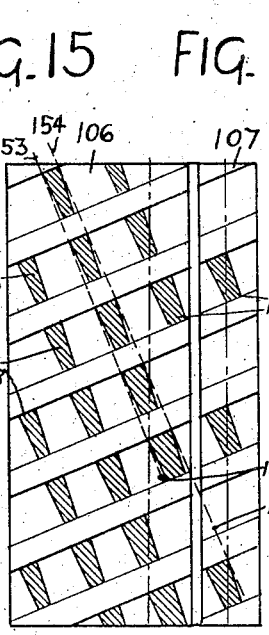

Fig. 11 indicates a cutting tool, which contains two parts 106 and 107, and which has roughing teeth 108 in addition to the finishing teeth 109.

Fig. 12 is a normal section through a pair of mating helical, or herringbone gears, taken perpendicularly to the direction of the teeth. The shown tooth form is particularly suitable for production according to my method. The tooth profiles 113, 114 are convex and concave circular arcs of substantially equal radii 115, 116. Their centers 117, 118 are situated on the respective pitch surfaces 119, 120. Such teeth contact along their whole profiles at once, in the moment namely, when the centers 117, 118 of mating profiles contact at 121.

The same holds true for a gear of this type meshing with a helical worm thread. The correct profile of the latter is therefore also a circular arc of substantially equal radius.

When the profile of contact between such two bodies is embodied by a cutting edge, this cutting edge will be qualified to produce circular teeth of the described character, when rotated about the axis of the helical worm, and when given a proper feeding motion.

Figure 13:
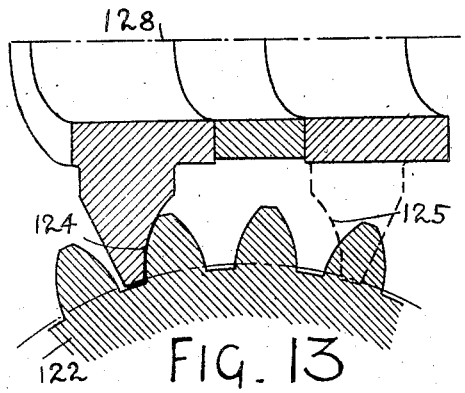
Fig. 13 is a normal section through the teeth of a gear of Fig. 12, and of a cutting tool.
Figure 14:
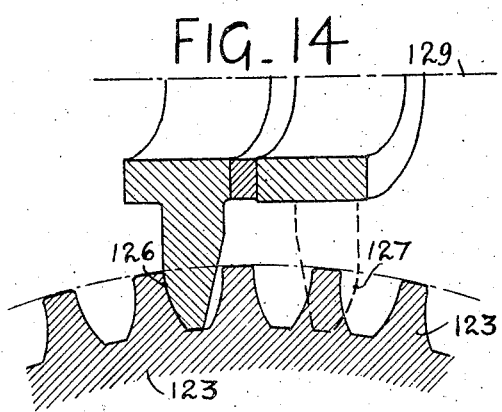
Fig. 14 is a normal section through the teeth of the other gear of Fig. 12, and of a cutting tool.

Fig. 13 indicates such a tool in cutting contact with a pinion 122, and Fig. 14 indicates a tool in contact with a gear blank 123. Cutting edge 124 is shown in cutting position in Fig. 13. The opposite cutting edge will be in cutting position 125, shown in dotted lines, after the blank has moved for a fraction of a pitch.

In Fig. 14 cutting edge 126 is seen in cutting position, while a cutting edge for finishing opposite tooth sides will be in cutting position 127 after the blank has moved on.

Axis 128 and axis 129 of the tools shown in Fig. 13 and Fig. 14 are inclined to the sectional planes. I preferably provide tools whose axes 128, 129 are inclined to said planes at angles which are considerably smaller than 60°. In other words, the axes 128, 129 are inclined to the direction of the teeth to be cut at angles in excess of 30°.

Figure 15:
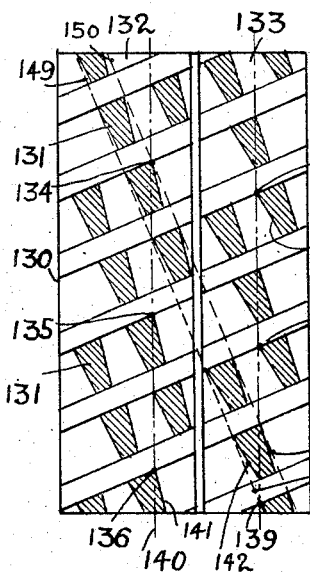
Fig. 15 and Fig. 16 are developments of the peripheries of modified rotary tools, such as may be used for producing a pair of gears containing helical teeth with convex and concave circular tooth profiles respectively.

Fig. 15 is a development of a cutting tool of modified aspect, for cutting helical teeth of circular profile, as indicated in Fig. 12, and especially teeth of convex circular profile.

130 denotes the developed periphery of the tool. The cutting teeth 131 are shown in section and are shadowed. They are arranged in two separate groups, projecting from two parts 132, 133. The finishing edges 134, 135, 136 and 137, 138, 139 are inwardly disposed. Finishing edges which act on the same side of the teeth of a blank, such as 134, 135, 136, are located on a concentric circle, which is shown as a straight line 140 in development. In other words, the finishing edges 134, 135, 136 are angularly displaced, but have the same position along the axis of the tool.

The sides 141 on part 132, and sides 142 on part 133, which contain the finishing edges, are preferably relieved sidewise, away from each other, in addition to any desirable amount of radial or inward relief.

Figure 16:
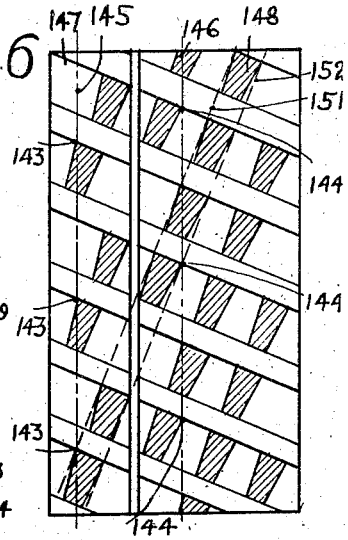

Fig. 16 is a development of a cutting tool having outwardly disposed finishing edges 143, 144, situated on lines 145 and 146 respectively. The sides 143 on part 147, and sides 144 on part 148 are preferably relieved toward each other. A cutting tool as indicated in Fig. 16 may be used with advantage for cutting helical teeth of concave circular profile, as indicated in Fig. 12.

Inasmuch as helical gear teeth, as indicated in Fig. 12 will contact with a helical worm thread along a circular tooth profile, cutting edges arranged in the form of such helical thread, will not contact with a finished tooth surface, except for the one cutting edge which coincides with said contact line. Referring to one side of the teeth, all cutting edges but one do merely roughing work, when arranged in a predetermined helical thread.

Hence either side of the threads of a cutting tool may be provided with the same lead, as indicated by the parallel lines 149, 150 in Fig. 15, and lines 151, 152 in Fig. 16. When provided with circular profiles corresponding to gears indicated in Fig. 12, a tool nevertheless is a copying tool. Other teeth, such as involute teeth, require a different lead on the two sides of the helical threads of a cutting tool of the described character, as indicated in Fig. 11 by the converging lines 153, 154.

It is obvious that cutting tools of the disclosed type must be set at a predetermined axial position, in analogy to milling cutters. When a tool is differently set along its axis (16 in Fig. 1), it would not produce the same teeth.

I have found that cutting tools for gears indicated in Fig. 12 are least sensitive to misadjustment. Such tools, Figs. 13–16, moreover may be used with mathematical accuracy on gears of different tooth numbers, like generating hobs, but unlike milling cutters. My method is therefore particularly valuable in this application.

It is understood, that further changes and modifications may be made in my invention, without departing from its spirit.

Instead of providing cutting edges which form the whole tooth profiles, a series of cutting edges could be provided, which form the tooth profiles in enveloping cuts. This is illustrated diagrammatically in Figure 17. Here the tool is designated at 158 and the blank at 159, portions of each, only, being shown. 160, 160' and 160'' indicate the positions of successive cutting edges of the tool when they come into cutting engagement with a tooth profile 161 of the blank. The cutting edge 160 makes contact with this tooth profile at point 162 at the root of the tooth. The cutting edges 160' and 160'' come into engagement with this tooth profile as the blank rotates on its axis, at points 162' and 162'' located midway the height of the profile and at the tip of the tooth, respectively. The point of contact between the tool and blank thus passes over the whole length of the tooth profile, while the cutting edges assume the positions 160, 160' and 160'' and while the blank turns through a portion of a pitch only. A tool such as just described would be an intermediate step between the known generating type of hob, and the disclosed copying cutter. It would differ from known hobs mainly by the number of finishing edges, required to finish the active profile of a tooth. Generating hobs finish said profile, in the average, with about 15 cutting edges. The tooth profile consists then of 15 small flats.

In this modification of my invention, the active profile of one side of the teeth of a blank may be formed with less than five different cuts, that is by cutting edges of less than five different positions. Such tooth profiles consist of less than five different parts, which necessarily must closely follow the tooth contour.

For such and other reasons I depend upon the annexed claims for defining the scope of my invention.

What I claim is:

1. The method of cutting gears which consists in providing a tool, having a plurality of curved cutting edges arranged in a thread, at least one of which is so shaped as to finish the whole length of a tooth profile, and in rotating said tool in continuous engagement with a gear blank so that a plurality of its cutting edges pass through each tooth space of the blank in each revolution of the blank, while simultaneously imparting a relative feed movement between the tool and blank across the face of the blank.

2. The method of cutting gears which consists in providing a tool, having a plurality of cutting portions arranged in a thread, said cutting portions being provided with curved cutting edges, at least two of said cutting edges being so shaped as to finish the whole length of the profiles of the two sides of the teeth of the blank, and in rotating said tool in continuous engagement with the blank so that a plurality of its cutting portions pass through a tooth space in each revolution of the blank, while simultaneously imparting a relative feed movement between the tool and blank across the face of the blank.

3. The method of cutting gear teeth of convex profile, which consists in providing a concavely curved cutting edge, in rotating said cutting edge, in turning a blank on its axis in timed relation, so that said blank is continuously indexed, and in relatively feeding said cutting edge in the direction of the axis of said blank to finish the whole height of a tooth side with said cutting edge.

4. The method of cutting gear teeth, which consists in providing a cutting tool having a plurality of identical, curved cutting edges, said cutting edges being angularly displaced, but equally located along the axis of said cutting tool, in positioning said cutting tool so that its axis includes an angle with the direction of the teeth to be cut, said angle being in excess of thirty degrees (30°), in rotating said cutting tool, in rotating a blank on its axis in timed relation to said cutting tool, and in relatively feeding said cutting tool across the face of the blank, to finish the whole active profile of a tooth side of the blank with cutting edges of equal axial position.

5. The method of cutting gear teeth of convex profile, which consists in providing a cutting tool consisting of two parts, said parts being adjustable with respect to one another, each part containing a plurality of identical, concavely curved cutting edges of equal axial position respectively, in rotating said cutting tool, in rotating a blank on its axis in timed relation to said cutting tool, and in providing feeding motion between the blank and the cutting tool, in the direction of the axis of the blank, to finish the teeth of said blank, each of said parts finishing one side of the teeth.

6. The method of cutting gear teeth of convex profile, which consists in providing a cutting tool containing two separate groups of concavely curved cutting edges, in rotating said cutting tool, in turning a blank on its axis in timed relation thereto, and in providing feeding motion between the blank and said cutting tool, in the direction of the axis of the blank, to finish the teeth of said blank, each of said groups finishing one side of the teeth.

7. The method of cutting gear teeth of convex profile on a cylindrical blank, which consists in providing a rotary cutting tool having two sets of oppositely disposed concavely curved cutting edges, the said two sets of cutting edges being adjustable with respect to each other, in setting the axis of said cutting tool at an angle to the direction of the teeth to be cut, in adjusting said tool in the direction of its axis to a predetermined position, in rotating said cutting tool, in rotating a blank on its axis in timed relation, and in relatively feeding the cutting tool in the direction of the axis of said blank, to simultaneously finish all the teeth.

8. The method of cutting gear teeth on cylindrical blanks, which consists in providing a rotary cutting tool composed of two parts, the cutting faces being differently inclined on said two parts, in rotating said cutting tool, in rotating a blank on its axis in timed relation thereto, and in providing feeding motion between the blank and said cutting tool in the direction of the axis of the blank, to finish the two sides of the teeth of the blank with said two parts of the cutting tool respectively.

9. The method of cutting gear teeth of convex profile on cylindrical blanks, which consists in providing a rotary cutting tool containing concavely curved cutting edges on cutting teeth arranged in the form of threads, two separate groups of cutting teeth being formed on said cutting tool, in rotating said cutting tool, and in feeding said cutting tool in engagement with a rotating blank, in the direction of the axis of said blank, to finish the two sides of the teeth with said two groups of cutting teeth respectively.

10. The method of cutting gear teeth of convex profile, which consists in providing a cutting tool containing cutting teeth arranged in the form of multiple threads, cutting faces being formed thereon by a number of flutes which contains a common factor with the number of said threads, the cutting edges of said tool being concavely curved, in rotating said cutting tool in engagement with a rotating blank, while providing feeding motion between the tool and the blank in the direction of the axis of said blank.

11. The method of cutting gear teeth of convex profile, which consists in providing a cutting tool having concavely curved cutting edges on cutting teeth which are inclined to the periphery of said tool, in rotating said cutting tool, in rotating a blank on its axis, and in relatively feeding said tool across the face of the blank, to finish the whole height of the tooth sides of the blank with cutting edges of equal position along the axis of said tool.

12. The method of cutting gear teeth of convex profile on a cylindrical blank, which consists in providing a rotary cutting tool containing concavely curved cutting edges, in rotating said cutting tool, in rotating a blank on its axis in timed relation to said tool, in providing feeding motion in the direction of the axis of the blank, and in finishing the whole active profile of one side of the teeth with cutting edges of less than five different axial positions.

13. The method of cutting gear teeth of convex profile on a cylindrical blank, which consists in providing a rotary cutting tool containing concavely curved cutting edges arranged in multiple threads, forming roughing teeth and finishing teeth on said cutting tool, in rotating said cutting tool, in rotating said blank on its axis in timed relation, in feeding the cutting tool across the face of the blank in the direction of the axis of said blank, to finish the whole active profile of one side of the teeth with less than five cutting edges of different axial position.

14. The method of cutting teeth on a pair of gears of dissimilar tooth shape, which consists in providing a pair of cutting tools having substantially circular convex and concave cutting edges respectively, the radii of said convex and concave cutting edges being substantially alike, in rotating a cutting tool, in rotating a blank on its axis in timed relation, and in providing feeding motion in the direction of the axis of said blank.

15. The method of cutting helical teeth on a pair of gears of dissimilar tooth shape, which consists in providing a pair of cutting tools having substantially circular convex and concave cutting edges respectively, the radii of said convex and concave cutting edges being substantially alike, a plurality of cutting edges having equal axial position, in rotating a cutting tool, in rotating a blank on its axis in timed relation, and in feeding said cutting tool across the face of said blank.

16. The method of cutting gear teeth of convex profile, which consists in providing a cutting tool containing cutting teeth arranged in the form of multiple threads, cutting faces being formed thereon by a number of flutes which contains a common factor with the number of said threads, in rotating said cutting tool in engagement with a rotating blank while providing feeding motion between the tool and the blank in the direction of the axis of said blank.

In testimony whereof, I hereto affix my signature.

ERNEST WILDHABER.